United States Patent [19]

Nakano et al.

[11] 4,365,312
[45] Dec. 21, 1982

[54] SEQUENCE CONTROLLER

[75] Inventors: Nobumasa Nakano; Noboru Takahashi; Masao Aoki, all of Nagoya, Japan

[73] Assignee: Mitsubishi Denki Kabushiki Kaisha, Tokyo, Japan

[21] Appl. No.: 71,415

[22] Filed: Aug. 30, 1979

[30] Foreign Application Priority Data

Aug. 30, 1978 [JP] Japan .................. 53-105934

[51] Int. Cl.³ .................. G06F 15/16; G06F 13/00
[52] U.S. Cl. .................. 364/900
[58] Field of Search ... 364/200 MS File, 900 MS File

[56] References Cited

U.S. PATENT DOCUMENTS

| | | | |
|---|---|---|---|
| 3,411,139 | 11/1968 | Lynch et al. | 364/200 |
| 3,510,844 | 5/1970 | Aranyi et al. | 364/200 |
| 3,787,818 | 1/1974 | Arnold et al. | 364/200 |
| 3,810,118 | 5/1974 | Kiffmeyer | 364/200 |
| 3,942,158 | 3/1976 | Dummermuth | 364/900 |
| 4,158,226 | 6/1979 | Struger et al. | 364/900 |
| 4,200,915 | 4/1980 | Struger et al. | 364/900 |
| 4,200,916 | 4/1980 | Seipp | 364/900 |
| 4,270,184 | 5/1981 | Shimokawa | 364/900 |

*Primary Examiner*—Eddie Chan
*Attorney, Agent, or Firm*—Sughrue, Mion, Zinn, Macpeak and Seas

[57] ABSTRACT

A sequence controller having a memory for storing predetermined control sequences, an operation device for sequentially reading the contents of the memory and executing the control sequences stored therein in accordance with externally supplied instructions, a programming panel for reading and displaying data from the memory and for writing the control sequence in the memory, bus lines coupled to the operation device and the panel, respectively, to permit parallel operation thereof without lowering the processing speed and to permit programming of the operation device without using conventional input-output instructions by supplying input and output data for operating an external controlled process from the operation device via an output memory.

7 Claims, 10 Drawing Figures

SEQUENCE CONTROLLER

BACKGROUND OF THE INVENTION

The invention relates to a programmable sequence controller in which a general purpose microprocessor such as a microcomputer chip relatively low in processing rate is employed in a translational mode to cyclically and successively process a series of sequence control data.

In general, in a conventional programmable sequence controller of this type, a minicomputer having a microprogramming function is employed as its central processing unit, the sequence dedication language is translated into process routines by using the instruction words of the mini-computer in advance, and the sequence execution is effected in the translational mode by successively applying the program loops of the sequence dedication language to the respective process routines.

The arrangement and operation of one example of such a conventional programmable sequence controller will be described.

The arrangement of this type of conventional programmable sequence controller is as shown in FIG. 1. The programmable sequence controller includes a central processing unit 1 (hereinafter referred to merely as "a CPU 1" when applicable), a microprogram memory 2, a sequence program memory 3, and a scratch pad memory 4.

The CPU 1 is capable of carrying out 8-bit or 16 bit parallel logic or arthmetic operations. In the conventional controller of the present example, a CPU capable of 8-bit parallel processing is employed.

The microprogram memory 2 is a high speed read only memory (ROM). Stored in the microprogram memory 2 are a microprogram 2A which is a set of microinstructions corresponding to sequence instructions for decoding and executing sequence dedication language and an operation procedure program 2B which functions as a sequence controller.

The sequence program memory 3 is a non-volatile memory such as a core memory the stored contents of which can be changed by writing. The function of sequence program memory 3 is to store a sequence program in which each sequence control step of a process to be controlled by the sequence controller is described in the sequence dedication language of the sequence controller.

The scratch pad memory may be either a non-volatile memory such as a core memory or a volatile memory such as a semiconductor memory. The scratch pad memory is an assembly of memories adapted to store the results of the processing steps for sequence control in real time or an assembly of memories adapted to store flags which indicate the present amount of data in a counter and a timer operated by software by indicating that the counter and the timer are in a filled-up state.

The programmable sequence controller further includes a plurality of contact means 9 which have been set to indicate states corresponding to a process which is externally controlled (hereinafter referred to as "external contact means 9" when applicable), a multiplexer 7 for selecting from eight optional external contact means 9A as specified by an address bus 101 of the CPU 1 by way of the external contact means 9, and an input buffer 5 made up of eight flip-flops. The input buffer 5 stores the on/off states of the external contact means 9A which have been selected by the multiplexer 7 upon a latch instruction on line 103 from the CPU 1. The stored contents 108 of the input buffer 5 are coupled through the data bus 102 to its corresponding CPU 1.

Plural output buffers 6 are provided, each including eight flip-flops. A demultiplexer 8 operates to select a single optional output buffer 6A which has been specified by the address bus 101 of the CPU 1 out of the set of output buffers 6. Upon receipt of a latch instruction on line 103 from the CPU 1, the demultiplexer 8 generates a latch instruction on line 109 which gates the latch instruction on line 103 from the CPU 1 solely to the particular output buffer 6A thus selected while allowing the output buffer 6A to retain the contents of the data bus 102 at that moment.

In FIG. 1, reference numeral 10 designates output relays which amplify the contents 110 of the output buffers 6 by means of amplifiers (not shown) which provide increased driving capability. The contact outputs of the output relays 10 are applied as the outputs of the sequence controller for operating the external process which is operated and controlled in accordance with the on/off states of the output relays 10.

A programming panel 11 is provided with a keyboard, display lamps, a digit display device, etc as desired. The programming panel 11 is connected to the address bus 101 and the data bus 102 of the CPU 1. The programming panel 11 accesses the sequence program memory 3, the scratch pad memory 4, the input buffer 5 and the output buffer 6 through the bus lines 101 and 102 so that a desired sequence program is written into the sequence program memory 3 by means of the keyboard while the contents of the sequence program memory 3 and the scratch pad memory 4 and the states of the external contacts 9 and the output relays 10 are read and the results thus read are indicated to the operator by means of the display lamps and the digit display mechanism.

The programmable sequence controller further includes a reading/writing control line 104 for applying a reading/writing control signal generated by the CPU 1 or the programming panel 11, a bus request signal line 105 for supplying a bus request signal which indicates a request for using the reading/writing line 104 to the CPU 1 from the programming panel 11, and a bus request acknowledge signal line 106 for supplying a bus request acknowledge signal which indicates to the programming panel 11 that the address bus 101, the data bus 102 and the reading/writing control line 104 have been disconnected from the CPU 1. The bus request acknowledge signal is provided by the CPU 1 in response to the bus request signal.

The operation of the conventional sequence controller of FIG. 1 thus organized will be described with reference to FIG. 2 which is a flow chart showing the contents and operation of the operation procedure program 2B of the sequence controller which is stored in the microprogram memory 2.

In the sequence controller, when the power switch is turned on or in response to a start-up operation procedure the CPU 1 resets the sequence program count 1B therein which has been specified by the microprogram 2A.

Next, a part of the contents of the sequence program memory 3 which corresponds to one step in sequence control of the externally controlled process is read out by the operation procedure program 2B with the contents of the sequence program counter 1B as the reading address. The contents thus read are discriminated in accordance with the operational procedure of program 2B. The sequence instruction for one step thus read is executed according to the microprogram 2A.

Sequence instructions stored in the sequence program memory 3 are indicated in FIG. 3. That is, those instructions are three different sequence control instructions, an input instruction 3A, an output instruction 3B, and a logic operation instruction 3C. An END instruction 3D is stored at the end of a series of these sequence control instructions 3A, 3B and 3D to indicate the completion of a series of sequential operations.

When the sequence control instruction read out of the sequence program memory 3 by the CPU 1 is the input instruction 3A, the CPU 1 transfers the required data into the accumulator 1A in the CPU 1 from the input address specified by the input instruction 3A.

In other words, in the case that the address of the input destination specified by the input instruction 3A is an address of the external contact 9, the CPU 1 applies the address thus specified to the address bus 101 so as to cause the multiplexer 7 to select the external contact 9A specified by the address bus 101. Then, when the latch command 103 is issued, the on/off state of the external contact 9A selected at that moment is stored in the flip-flops of the input buffer 5. The contents thus stored in the input buffer 5 are written into the accumulator 1A of the CPU 1 through the data bus 102. At this point, reading the on/off state of an external contact 9A by the CPU has been completed.

In the case where the address of the input destination specified by the input instruction 3A is an address in the scratch pad memory 4, the address thus specified is applied to the address bus 101 similarly while the contents of the address thus specified in the scratch pad memory 4 is coupled into the accumulator 1A in the CPU directly through the data bus 103. Thus, in this fashion, the contents of the counter, the state of the timer, and the state of the flag which have been stored in the scratch pad memory 4 are read by the accumulator 1A of the CPU 1.

In the case that the sequence control instruction read is the output instruction, the CPU 1 applies the address of the output destination specified by the output instruction to the address bus 101 and the contents of the accumulator 1A and transfers it to the data bus 102 after which the latch command 103 is issued. According to what is indicated on the address bus 102, the demultiplexer 8 selects one (6A) of the output buffers 6. A latch command 109 obtained by gating the latch command 103 from the CPU 1 through the demultiplexer 7 is applied only to the particular output buffer 6A thus selected and the contents of the data bus 102 at that moment, namely, the contents of the accumulator 1A, are stored in the output buffer 6A selected. The contents stored in the output buffer 6A are coupled through the output relay 10 for operating the externally controlled process.

In the case that the sequence control instruction read is a logic operation instruction 3C, the CPU 1 carries out an operation similar to that in the case that the input instruction is read and, accordingly, the operand for operation is applied to the data bus. Thereafter, an operation specified by the logic operation instruction 3C is carried out with respect to the contents of the data bus 102 and the contents of the accumulator 1A with the result of the operation becoming the contents of the accumulator 1A.

Wherever any one step of a sequence control instruction, that is, a single step operation of the input instruction 3A, output instruction 3B or logic operation instruction 3C, is completed, the CPU 1 advances by one step the contents of the sequence program counter 1B according to the instructions of the microprogram 2A so as to read and execute the next step of the sequence program memory 3. Thereafter, as this operation is repeatedly carried out, the contents of the sequence program memory 3 are successively executed.

In the case that the sequence instruction read out of the sequence program memory 3 by the CPU 1 is the END instruction 3D, the sequence counter 1B is reset. Accordingly, the CPU 1 successively reads step-by-step the sequence control instructions 3A, 3B and 3C stored in the sequence program memory 3 and advances the sequence control while repeating the execution of the contents thereof.

Described next are the operations of rewriting the contents of the sequence program memory 3 by means of the programming panel 11 and reading the contents of the sequence program memory 3 and the scratch pad memory 4, the input and output state (the on/off states 107 of the external contents 9), and the contents 110 of the output buffers 6 by means of the programming panel 11.

First, the bus request signal is sent from the programming panel 11 to the CPU 1 which has executed the above-described sequence. Upon receipt of the bus request signal, the CPU temporarily stops its operation after completing the execution of the step of microinstruction which is then being executed. Then, the CPU 1 releases the address bus 101, the data bus 102 and the reading/writing control line 104 by disconnecting those bus lines from its control lines. Subsequently, the CPU 1 sends the bus request acknowledge signal to the programming panel 11 through the bus request acknowledge signal line 106.

Upon receipt of the bus request acknowledge signal, the programming panel 11 uses the address bus 101, the data bus 102 and the reading/writing control line 104, now disconnected from the control lines of the CPU 1, to rewrite the contents of the sequence program memory 3.

The programming panel 11 has as one of its functions the reading of the input and output states 107 and 110 with respect to the externally controlled process and the contents of the sequence program memory 3 and the scratch pad memory 4 and displaying the data thus read on the programming panel 11, as required. The operation of the sequence program panel 11 will not be described because it operates completely the same as the above-described operation of rewriting the contents of the sequence program memory 3.

Upon completion of the above-described reading/writing operation, the programming panel 11 interrupts the application of the bus request signal to the CPU 1 on the bus request signal line 105 and disconnects the address bus 101, the data bus 102 and the reading/writing control line 104. When the application of the bus request signal is interrupted, the CPU 1 turns off the bus request acknowledge signal issued on the bus request acknowledge signal line 106, returns to its operational state from its halted state, and starts again the execution of the sequence control operation beginning with the next step in sequence which had not been executed because of the receipt of the bus request signal.

With a conventional programmable sequence controller thus organized in which a general purpose computer is operated in a translation mode, the microinstruction processing speed of the computer must be high, less than 1 to 2 $\mu$sec, in order to process a required thousand or so steps at a response speed equivalent to that of the sequence control using ordinary relays.

With respect to this requirement, no particular difficulty is encountered if a microprocessor such as a minicomputer utilizing bipolar semiconductor device elements is employed as the CPU. However, if a computer having a lower processing rate as, for example, a microcomputer chip utilizing an MOS-type process, is used as the CPU, then the response speed is undesirably reduced to $\frac{1}{4}$ to 1/10 of the response speed compared to the case where bipolar elements are employed. The microprocessing speed is considerably lower, for instance 4 to 10 $\mu$sec.

In a conventional sequence controller, if the programming panel is operated while the CPU is executing a sequence program, the CPU must temporarily suspend its operation. Therefore, such a conventional sequence controller is disadvantageous in that the speed of execution of the sequence program, that is, the response speed thereof, is further decreased.

Furthermore, in general, in an ordinary microcomputer chip, the processing speed of the input instruction/output instruction for the outside is reduced to about 1/1.5 to 1.2 of the processing speed for the input and output instructions for the memories. Accordingly, in a method in which, as in the above-described conventional sequence controller, a relatively high number of input instructions/output instructions to the outside must be used, the processing speed is further decreased. This further exasperates the problems involved in using a microcomputer chip lower in speed and in cost as the CPU of the sequence controller.

SUMMARY OF THE INVENTION

Accordingly, an object of this invention is to eliminate the above-described difficulties characteristic of a conventional sequence controller. More specifically, an object of the invention is to provide a programmable sequence controller small in size and low in cost in which a microcomputer chip or the like relatively low in its processing rate and low in cost is used in a translational mode to process a sequence of on the order of 1,000 steps at a response rate equivalent to that of a device which is constructed with ordinary relays.

In a programmable sequence controller according to the invention, a dedicated bus line is provided for a central processing unit (CPU) which is a first processing device, while a dedicated bus line is provided for a second processing device which is, for instance, a programming panel, so that the central processing unit and the programming panel can be operated in a parallel mode thereby to improve the process rate of the central processing unit (CPU).

Furthermore, the programmable sequence controller according to the invention is so designed that a third processing device, namely an input and output processing device, and a third memory device, namely an input and output memory, are provided separately to allow the CPU to perform input and output of information with respect to an externally controlled process. Therefore, the CPU can be programmed without using ordinary input and output instructions with the result that the processing rate of the CPU is further improved. That is, even if a microcomputer chip having a relatively low processing rate is used as the CPU, it is nonetheless still possible according to the invention to provide a sequence controller with a high response rate.

Furthermore, according to the invention, instead of a programming panel, a process computer may be employed as the second processing device. In this embodiment, the sequence controller can also perform on-line monitoring, trouble detection, etc. Thus, the programmable sequence controller of the invention is both low in manufacturing cost and high in performance.

DESCRIPTION OF THE PREFERRED EMBODIMENT

Figure 1:
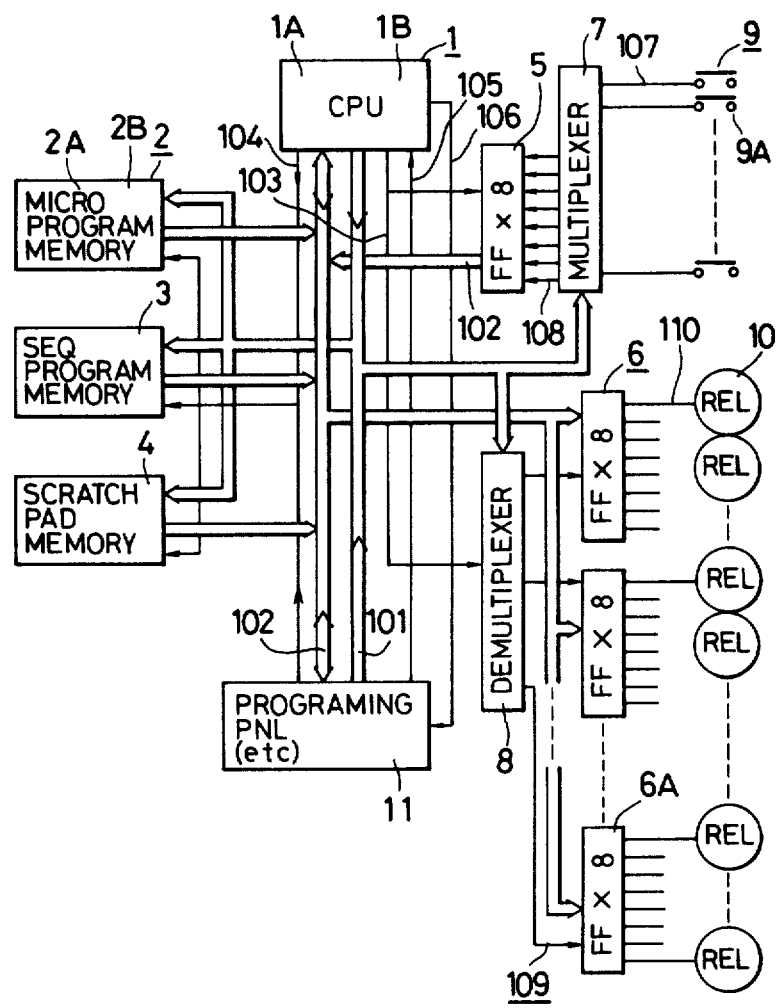
FIG. 1 is a block diagram showing an example of a conventional programmable sequence controller in which a microcomputer is used as the central processing unit.
Figure 4:
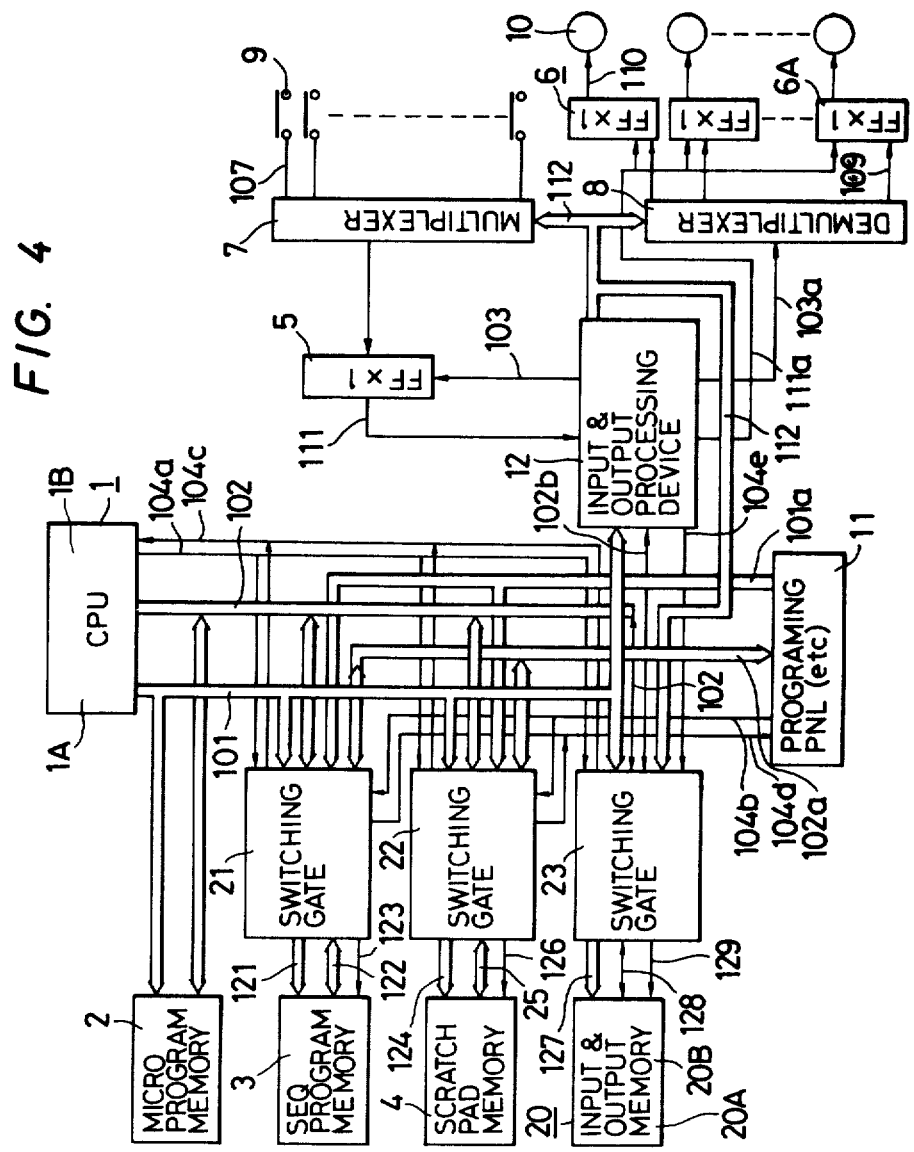
FIG. 4 is a block diagram showing one embodiment of a programmable sequence controller according to the present invention.

An arrangement of one embodiment of a programmable sequence controller according to the present invention is shown in FIG. 4 in which those components which have been previously described with reference to the conventional sequence controller in FIG. 1 have been similarly numbered.

In FIG. 4, an input and output memory 20 constitutes a third memory device constructed of semiconductor memories. The input and output memory 20 includes an $n_2$-bit output memory section 20B for storing the data which is to be coupled out for operating the externally controlled process from a central processing unit (CPU) 1 which constitutes a first processing unit, and an $n_1$-bit output memory section 20A whose contents are transferred into the CPU 1 as required for controlling the operation of the CPU 1. It is to be understood that the capacities $n_1$-bits and $n_2$-bits of the input memory section 20A and the output memory section 20B in the input and output memory 20 are necessarily greater than the maximum number of inputs and the maximum number of outputs for the externally controlled process which is controlled by the sequence controller.

A third processing device is formed by an input and output processing device 12 which is provided for carrying out the operation of periodically writing the on/off state of an external contact 9 into the input memory section 20A in the input and output memory 20 and the process of periodically transferring the contents of the output memory section 20B to the output relay 10.

Reference numeral 7 designates a multiplexer for selecting one (9A) out of the set of external contacts 9 in response to an instruction over the address line 112 of the input and output processing device 12 while reference numeral 5 designates an input buffer constituted by a single flip-flop. The input buffer 5 stores data points representing the on/off state 107 of the external contact 9A which is selected by the multiplexer 7 at the moment the input buffer 5 receives a latch command 103 from the input and output processing device 12. The input buffer transfers the data points representing the on/off state to the input and output processing device 12 by way of a data line 111. This data is written into the input memory section 20A in the input and output memory 20.

Reference numeral 6 designates an output buffer including one flip-flop, and reference numeral 8 designates a demultiplexer adapted to apply a latch command on line 109 to only one output buffer 6A specified by the address bus 112 of the input and output processing device 12. This latch command on line 109 is obtained by gating a latch command 103a from the input and output processing device 12. In the output buffer 6A to which is applied the latch command on line 109, the contents of a data line 111a is stored upon receipt of the latch command. The output relay 10 is operated in accordance with the contents thus stored.

A programming panel 11 constitutes a second processing unit. In the programming panel 11, the bus request signal as used in the conventional sequence controller is not used. Instead of the reading/writing control line 104 for the sequence program memory 3 and the scratch pad memory 4 as used in the conventional sequence controller, there are here provided two control lines, one a CPU reading/writing control line 104a for the CPU 1 only and a programming panel reading/writing control line 104b for the programming panel 11 only. Answer back signal lines 104c and 104d are provided for transmitting answer back signals from the memories 3 and 4 in response to the reading/writing request signals over the reading/writing control lines 104a and 104b, respectively.

A first switching gate 21 is provided corresponding to the sequence program memory 3 which is a first memory device. The first switching gate 21 interprets the contents of the address bus 102 of the CPU 1 or the contents of the address bus 101a of the programming panel 11 which is provided together with the reading/writing request signal of the CPU reading/writing control line 104a or of the programming panel's reading/writing control line 104b, so that, if the contents thus interpreted is a reading/writing request to the sequence program memory 3, the address/data bus 121/122 of the sequence program memory 3 is selectively connected to either the adress/data bus 101/102 of the CPU 1 or the address/data bus 101a/102a of the programming panel 11 for an ordinary reading/writing operation. In the case that another reading/writing request is produced during the reading/writing cycle, the first switching gate 21 operates to delay the answer back signal to the answer back lines 104c and 104d in response to the reading/writing request signal on the reading/writing control line 104a or 104b and to respond to a new reading/writing request after the completion of the preceding reading/writing cycle.

A second switching gate 22 is provided corresponding to the scratch pad memory 4 which constitutes a second memory device. The operation of the second switching gate 22 with respect to the scratch pad memory 4 is completely the same as the operation of the first switching gage 21 with respect to the sequence program memory 3. That is, the second switching gate 22 selectively connects the address/data bus 124/125 of the scratch pad memory 4 to either the address/data bus 101/102 of the CPU 1 or the address/data bus 101a/102a of the programming panel 11 for reading/writing of the contents thereof.

In order to ensure proper execution of the reading/writing operation between the CPU 1, which is a microcomputer chip, or the programming panel 11 and an external memory irrespective of the operating speed of the latter, it is necessary that after accessing the relevant memory, the CPU 1 or the programming panel carries out an operation as follows. The CPU 1 or the programming panel 11 is so designed that it carries out this operation after receiving an answer back signal from the memory. Thus, even if the CPU 1 or the programming panel 11 is placed in a standby state after accessing a memory, there will be conflict.

A third switching gate 23 is provided corresponding to the input and output memory 20 which constitutes a third memory device. Similarly as in the first and second switching gates 21 and 22, the third switching gate 23 has as its function switching the address/data bus 101/102 of the CPU 1 and the address/data line 112/102b of the input and output processing device 12. However, when the CPU 1 accesses the input and output memory 20, the third switching gate is switched to the side of the CPU 1. Thus, only when the CPU 1 is not accessing the input and output memory 20 can the input and output processing device 12 access the input and output memory 20.

Unlike the first and second switching gates 21 and 22, it is unnecessary to provide a logical decision regarding selection of the third switching gate 23. Hence, the third switching gate 23 may be constructed of a simple gate circuit.

The operation of the programmable sequence controller thus organized will be briefly described.

The input and output processing device 12 operates during the period the CPU 1 makes no access to the input and output memory, that is, during the period the device 12 repeatedly and periodically carries out the input and output operations with respect to the externally controlled process.

First, in order to successively read the on/off states of the external contacts 9, the input and output processing device 12 permits the address bus 112 to specify one of the addresses of the external contacts 9, the multiplexer 7 is caused to select the external contact 9A thus specified, the latch command 103 is transmitted from the input and output processing device to the input buffer 5, and the on/off state of the external contact 9A specified at this time instant is stored in the flip-flop of the input buffer 5. The contacts of the input buffer 5 are applied to the data line 111 of the input and output processing device 12.

In this operation, the CPU 1 does not access the input and output memory 20. Therefore, the third switching gate 23 operates to connect the address/data line 127/128 and the reading/writing control line 129 of the input and output memory 20 to the address/data line 112/102b and the reading/writing control line 104e of the input and output processing device 12, and the contents of the input buffer 5 are therefore written in as one bit in the input memory section 20A of the input and output memory 20 corresponding to the external contact 9A specified by the address bus 112 of the input and output processing device. The operation of reading the on/off state of the external contact 9 and writing a data point corresponding to it into a corresponding single bit location in the input memory section 20A is effected successively for all of the external contacts 9 in accordance with the instruction from the input and output processing device 12.

When the on/off states of all the external contacts 9 have been read as described above, the input and output processing device 12 specifies the one bit in the output memory section 20B of the input and output memory 20 through the address bus 127 to be connected to the input and output memory 20 via the address bus 112. The contents of the single bit location thus specified are read into the input and output processing device 12 through the data lines 128 and 102b and are then applied to the data line 111a. Furthermore, when a latch command 109 obtained by gating the latch command 103a of the input and output processing device 12 with the demultiplexer 8 is transmitted to the output buffer 6A which has been specified by the address bus 112, the contents of the data line 111a at that moment, that is, the contents of the relevant single bit in the output memory section 20B of the input and output memory 20, are stored in the output buffer 6A mentioned /above. The above-described operation of reading the contents of the particular single bit in the output memory section 20B of the input and output memory 20 and writing it into the relevant output buffer 6 is successively effected for all of the output buffers 6 and accordingly all of the output relays 10.

When all of the writing operations of the contents of the output memory section 20B in the input and output memory 20 into the output buffer 6 have been accomplished, the on/off states 107 of the external contacts 9 are read. Thus, input and output operations with respect to the externally controlled process are repeatedly and continuously carried out.

The contents of the input memory section 20A in the input and output memory 20 are read by repeatedly carrying out the input and output operation as described. Therefore, then on/off states of the external contacts 9 can be detected although there may be a little time lag. Furthermore, the states of the output buffers and accordingly the states of the output relays 10 can be changed, and the contents thereof can be transferred to the externally controlled process although there may be a some small time lag due to rewriting the contents of the output memory section 20B into the input and output memory 20.

If the CPU 1 accesses the input and output memory 20 while information is exchanged between the externally controlled process and the input and output memory 20 by the input and output processing device 12, then the above-described reading/writing operation of the input and output processing device 12 with respect to the input and output memory 20 is suspended. However, the duration of the suspension is very short and its frequency of occurrence is very low so that it can accordingly be considered that the reading/writing operation of the input and output processing device 12 with respect to the input and output memory 20 is substantially a continuous operation. A time lag corresponding to a maximum of one period of the input and output processing device 12 may occur between the transfer of the contents of the input and output memory 20 to the externally controlled process. However, in practice, the time lag can be disregarded.

Figure 2:
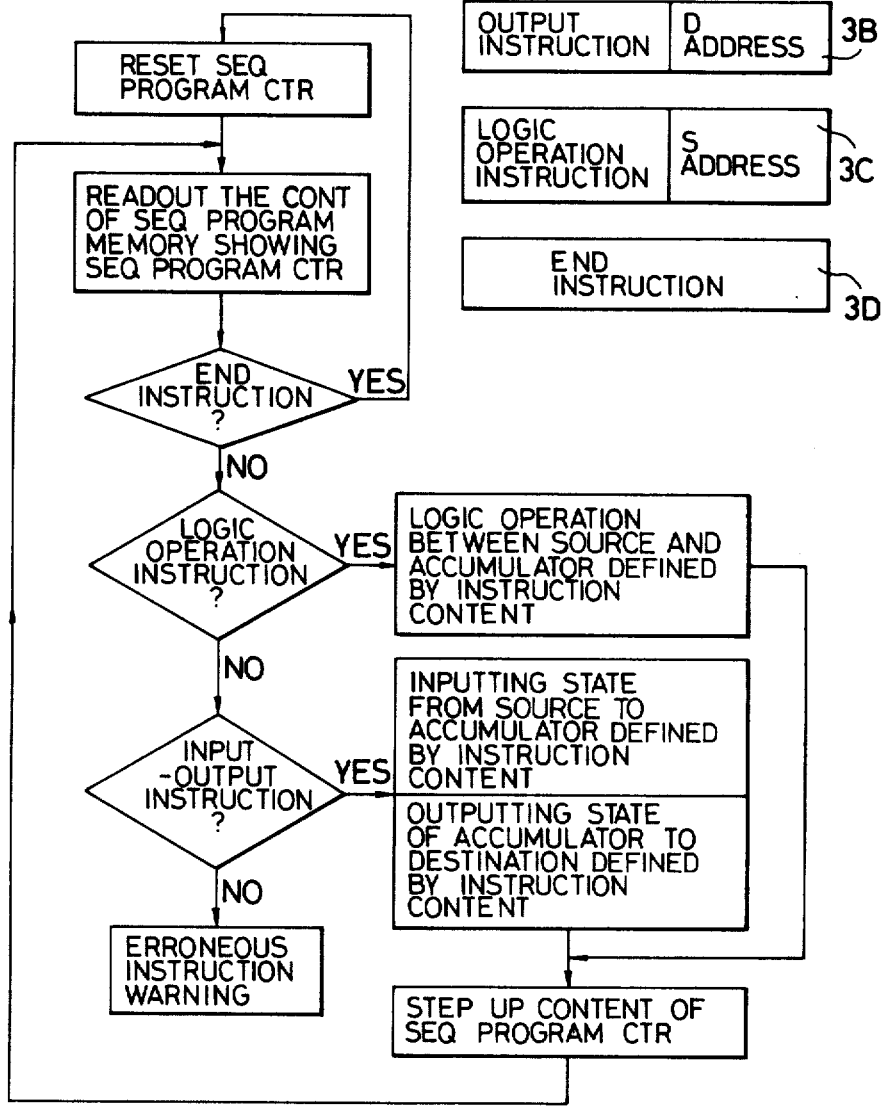
FIG. 2 is a flow chart illustrating the contents of an operation procedure program.

On the other hand, similar to the conventional sequence controller, the CPU 1 operates in accordance with an operating procedure as indicated in the flow chart of FIG. 2, which has been stored in the microprogram memory 2, to reset the sequence program counter 1B when the power switch is turned on or when the starting operation is effected. Subsequently, the CPU 1 reads the contents of the sequence program memory 3 through the first switching gate 21, with the contents of the sequence program counter 1B as the reading address.

This reading operation causes the CPU 1 to specify a given memory cell in the sequence program memory 3 through its address bus 101 and to specify a reading operation through the reading/writing control line 104a. If the programming panel 11 is not accessing the sequence program memory 3, the first switching gate 21 accepts the access from the CPU 1 and causes the CPU 1 to carry out the reading operation. Upon completion of the reading operation, the first switching gate 21 supplies the answer back signal to the CPU 1 on the answer back signal line 104c. In this manner, the operation of the CPU 1 of reading the contents of the sequence program memory 3 is performed.

If the programming panel 11 is accessing the sequence program memory 3 when the CPU 1 attempts to access the sequence program memory 3, the first switching gate 21 does not permit the CPU 1 to carry out the reading operation until the access of the programming panel 11 is completed. However, in this case, transmission of the answer back signal to the CPU 1 is delayed accordingly.

Figure 3:
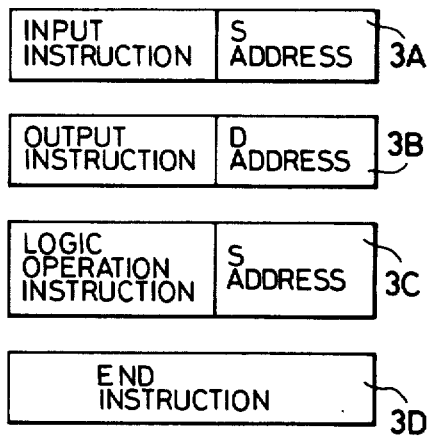
FIG. 3 shows format of sequence control instructions.

In the case that the contents thus read by the CPU 1 out of the sequence memory program is the input instruction 3A shown in FIG. 3, the CPU 1 couples the address of the input destination specified by the input instruction 3A onto the address bus 101.

If the address of the input destination corresponds to a particular bit in the input memory section 20A of the input and output memory 20, then the CPU 1 reads the data of the specified address through the third switching gate 23. In this operation, it is ensured that access of the CPU 1 will not race with access from the input and output processing device 12 in that the reading operation of the CPU 1 is given precedence over access from the input and output processing device 12 at all times.

In the case that the address of an input destination designated by the input instruction 3A is an address in the scratch pad memory 4, the CPU 1 reads the contents thereof into the CPU 1 itself via the second switching gate 22 similar to the case of reading the contents of the sequence program memory 3 via the first switching gate 21.

In the case that the contents read by the CPU 1 out of the sequence program memory 3 is the output instruction 3B as shown in FIG. 3, the address of an output destination specified by the output instruction 3B is coupled onto the address bus 101 in accordance with the instruction from the microprogram 2A. This address corresponds to a particular address in the output memory section 20B of the input and output memory 20 and the contents of the accumulator 1A are transferred to the specified address by the CPU 1. In this case also, access from the CPU to the input and output memory 20 takes precedence over access from the input and output processing device 12 at all times.

The data thus read out of the input memory section 20A in the input and output memory 20 by the CPU 1 is that which is obtained by periodically reading the on-/off states of the external contacts 9 with the input and output processing device 12 while the data written into the output memory section 20B of the input and output memory 20 is coupled out periodically to the output relays 10 by the input and output processing device 12. Therefore, execution of the input instruction 3A and the output instruction 3B with respect to the input and output memory 20 by the CPU 1 is equivalent to the input and output of information being effected indirectly between the externally controlled process and the controller.

The remaining operations other than those described above of the CPU 1 are similar to those of the CPU 1 in the conventional sequence controller and therefore will not be described.

When the programming panel 11 reads and alters the contents of the sequence program memory 3 and the scratch pad memory 4, the programming panel 11 uses its own address bus 101a, data bus 102a and reading-/writing control line 104b to access the sequence program memory 3 or the scratch pad memory 4 independently of the CPU 1. That is, the programming panel 11 loads the address value of the relevant memory 3 or 4 on the address bus 101a, to control the reading/writing operation through the reading/writing control line 104b. If the relevant memory 3 or 4 is not being accessed by the CPU, the first switching gate 21 or the second switching gate 22, accepting the reading/writing instruction, connects the address/data bus 101a/102a of the programming panel 11 to the address/data bus 121/122 or 124/125 of the memory 3 or 4 for performing a designated reading/writing operation. Upon completion of the reading/writing operation, the answer back signal is supplied to the programming panel to signal the completion of the reading/writing operation.

If the memory 3 or 4 which the programming panel 11 tries to access is then being accessed by the CPU 1, the reading/writing operation of the programming panel 11 with respect to the memory 3 or 4 is not carried out until access of the CPU 1 is ended and, accordingly, transmission of the answer back signal from the first switching gate 21 or the second switching gate 22 to the programming panel 11 is appropriately delayed.

As is apparent from the above description, the memory accessing operation of the programming panel 11, unlike that in the conventional case requires no additional sequence such as that therein needed for exchanging the bus request signal and the bus request acknowledge signal. If the memory to be accessed by the CPU 1 is different from one to be accessed by the programming panel 11, the two accessing operations can be carried out in a parallel mode. That is, an order to conduct one of the two access operations while the other is simultaneously being carried out, it is unnecessary to suspend the other.

Now, the arrangements and operations of one example of the input and output processing device 12 and of examples of the first, second and third switching gates 21, 22 and 23 in the programmable sequence controller according to the invention will be described in more detail.

Figure 5:
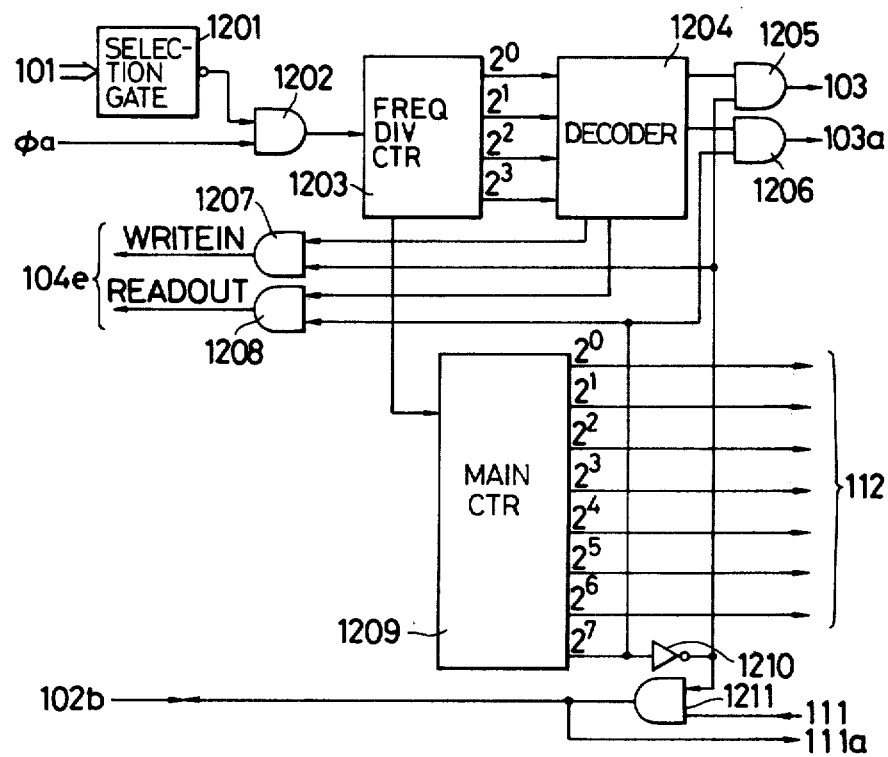
FIG. 5 is a block diagram showing an arrangement of an input and output processing device which may form a third processing device in the programmable sequence controller of the invention shown in FIG. 4.

The input and output processing device 12, as shown in FIG. 5, includes counter timing pulse generating means whose count capacity is greater than the bit number $(n_1+n_2)$ of the input and output memory 20, that is the sum of the maximum number of inputs and the maximum number of inputs and the maximum number of outputs in the sequence controller and count gate means.

In FIG. 5, reference numeral 1201 designates a selection gate which decodes the contents of the address bus 101 of the CPU 1 and which sets its output to "0" (the output being off) only when the contents thus read are representative of the address range of the input and output memory 20. Reference numeral 1202 designates an AND gate for gating the clock pulse stream $\phi a$ of the CPU 1. The AND gate 1202 is operated by the output of the selection gate 1201. More specifically, the AND gate 1202 is opened when the output of the selection gate 1201 is at "1" and is closed when the output is at "0". The clock pulse stream $\phi a$ is continuously generated after the power switch is turned on. Thus, the AND gate 1202 puts out the clock pulse stream $\phi a$ only when the CPU 1 does not access the input and output memory 20 with its address bus 101.

A frequency division counter 1203 receives as its input signal the clock pulse stream $\phi a$ through the AND gate 1202, and subjects the clock pulse stream $\phi a$ to 1/16 frequency division. To this effect, whenever the frequency division counter 1203 has reached its full count after counting sixteen clock pulses, the counter 1203 produces an output carry pulse. The frequency division counter 1203 is preferably a 4-bit binary counter. A decoder 1204 is provided to decode the state of the outputs ($2^0$, $2^1$, $2^3$) of the frequency division counter. The decoder 1204 applies at least two timing pulses to AND gates 1205, 1206, 1207 and 1208 during one period.

A main counter 1209 operates to count the output carry pulses from the frequency division counter 1203. The main counter 1209 repeatedly carries out its counting operation at least $(n_1+n_2)$ times or more, where $n_1$ and $n_2$ are the bit numbers of the input memory section 20A and the output memory section 20B in the input and output memory 20. In this example, $n_1=128$, and $n_2=128$ so that $(n_1+n_2)$ is 256. Accordingly the main counter is an 8-bit binary counter ($2^8=256$). When the main counter 1209 counts up to 255, then the count output thereof returns to zero. This operation is repeatedly performed.

The lower significant bits ($2^0$ through $2^6$) of the output of the main counter 1209 are applied through the address bus 112 to the demultiplexer 8 and the input and output memory 20. The most significant bit ($2^7$) is inverted by an inverter 1210 with the resultant signal and the original signal employed as gate signals to determine whether the input operation or the output operation is to be carried out. In this circuit, when $(2^7)=$"0", the output operation, namely the operation of writing the state of the auxiliary controlled process (the on/off states of the external relays 9) is carried out and when $(2^7=$"1"), the output operation, namely the operation of transferring the contents of the input and output memory 20 to the output relays 10 for controlling the externally controlled process.

In other words, in the input operation with $2^7=$"0", the AND gates 1205 and 1207 are opened to pass a timing pulse from the decoder 1204 as the latch command 103 to the input buffer 5 and as the writing control signal on the reading/writing control line 104e while the AND gate 1211 is opened to connect the data line 111 of the input buffer 5 to the data line 102b of the third switching gate 23 so that the contents of the input buffer 5 can be supplied to the input and output memory 20. In the output operation with $(2^7)=$"1", the AND gates 1206 and 1208 are opened to pass a timing pulse from the decoder 1204 as the latch command 103a applied through the demultiplexer 8 to the output buffer 6 and as the reading control signal on the reading/writing control line 104e.

The operation of the input and output processing device 12 thus organized will now be described. When the CPU 1 accesses the input and output memory 20, that is, when the contents of the data bus 101 of the CPU 1 includes the address of the input and output memory 20, then the output of the selection gate 1201 is at "0" and the AND gate 1207 is opened. Therefore, the clock pulse stream $\phi$a is not applied to the frequency division counter 1203 and, accordingly, the input and output processing device 12 is not operated.

While the CPU 1 does not access the input and output memory 20, the main counter 1209 is operated by the carry pulse from the frequency division counter 1203. When the contents of the main counter 1209 are "00000000" to "01111111", or 0 to 127, then $(2^7)=$"0" which corresponds to the period of writing data into the input and output memory 20. During this period, the data "00000000", "00000001", "00000010", . . . and "11111111" are successively coupled out to the data bus 127 to thereby successively specify the input contacts 9 and the addresses in the input and output memory 20 for carrying out the writing operation. The timing and the behavior of the signals employed in writing a single segment of information as related above are as indicated in the part (A) of FIG. 6.

Figure 6A:
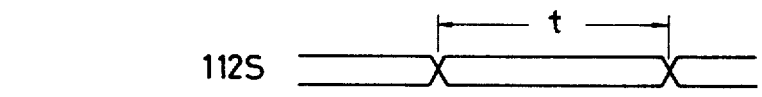
FIGS. 6A and 6B are timing diagrams indicating the timing and relative phase relationships of signals useful for facilitating a description of the operation of the input and output processing device in FIG. 5.

In FIG. 6A, reference character 112s designates an address output on the address bus 112. During a predetermined period t, a latch command 103 to the input buffer 5 is generated and subsequently the writing control signal 104eA to the input and output memory 20 is formed. In this case, the on/off state 107 of the external contact 9A specified by the contents of the address bus 112 is latched in the flip-flop of the input buffer 5 and the value thus stored becomes the contents of the data line 111. As the AND gate 1211 is open, the contents of the data line 111 are applied to the data line 102b and is then written into a location, specified by the address bus 112, in the input memory section 20A of the input and output memory 20 with the aid of the writing control signal on the reading/writing control line 104e. Upon completion of this operation, the contents of the main counter 1209 are advanced by one step to write the on/off state of the next external contact 9 into the input and output memory 20. This is repeatedly carried out until the contents of the counter reach "01111111".

When the contents of the main counter are from "10000000" to "11111111", or from 128 to 255, then $(2^7)=$"1". Therefore while data is read out of the input and output memory 20, the data "00000000", "00000001", . . . and "11111111" are successively applied to the data bus 127 to successively specify the addresses of the input and output memory 20 and the output buffers 6 to thereby carry out the reading operation. The timing and the behavior of the signals employed in reding one segment of information described above and transferring it to the outuput buffer 6 are as indicated in FIG. 6B.

Figure 6B:
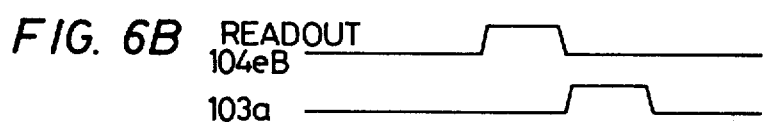

In FIG. 6B, 112s designates an address output to the address bus 112. During the predetermined period t, the reading control signal 104eB to the input and output memory 20 is generated, and thereafter the latch command 103a to the output buffers 6 is produced. The contents stored at a location specified by the address bus 112 in the output memory section 20B of the input and output memory 20 are read by applying the reading control signal 104eB to the data line 102b and the contents are subsequently latched in the output buffer 6A specified by the address bus 112 with the aid of the latch command 103a. This operation is continued until the contents of the main counter 1209 reach "11111111", or 255. Subsequently, the contents of the main counter 1209 become "00000000", and the above-described writin operation is repeated.

Figure 7:
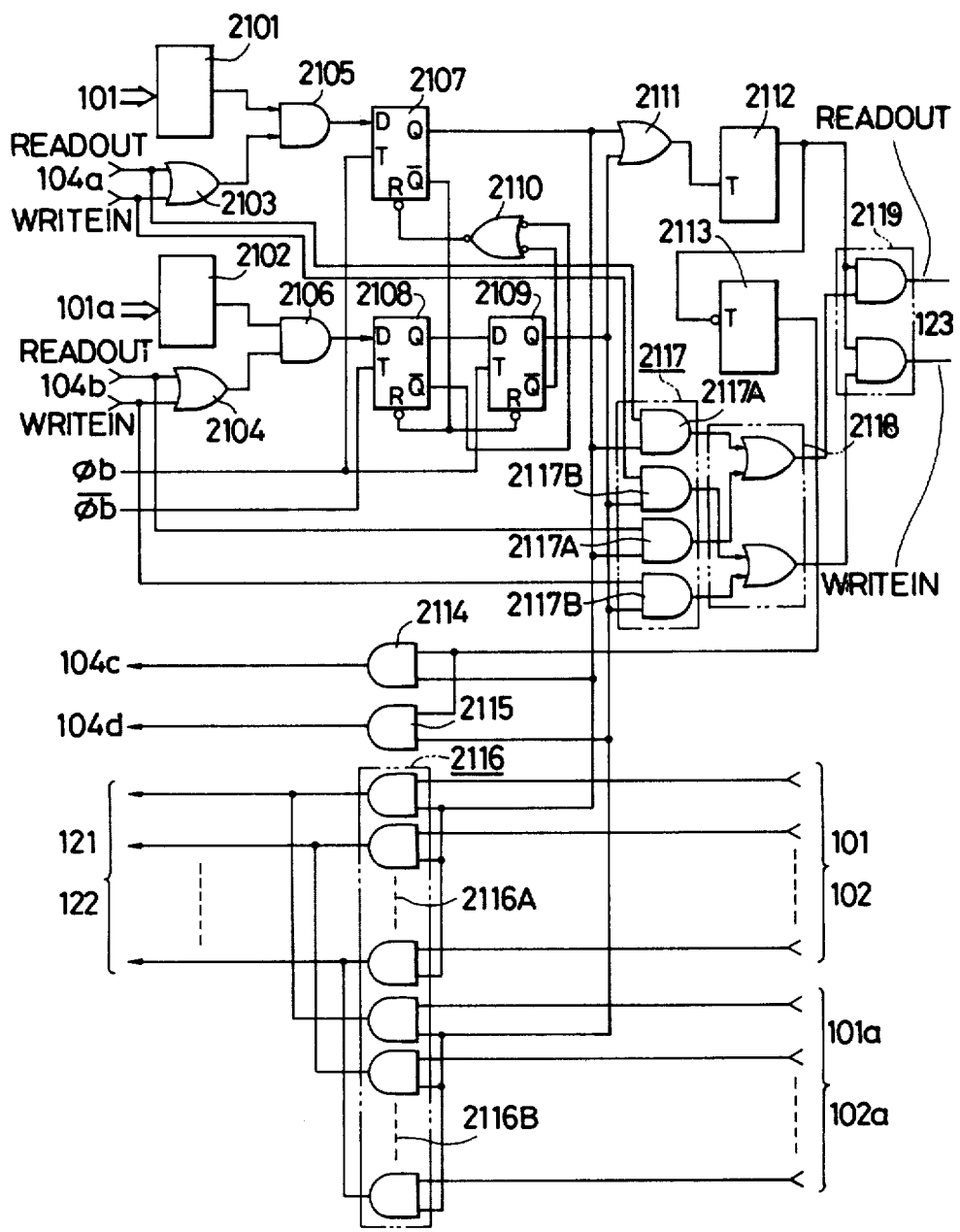
FIG. 7 is a block diagram showing an arrangement of a first or second switching gate in the programmable sequence controller shown in FIG. 4.

Shown in FIG. 7 is one example of the first switching gate 21 which is quite similar to the second switching gate 22. Accordingly, the arrangement of the first switching gate 21 only will be described.

In FIG. 7, reference numeral 2101 designates a selection gate whose output is raised to "1" when the contents of the address bus 101 of the CPU 1 are within the address range of the sequence program memory 3 which is the corresponding memory thereto, 2103 an OR gate to which the reading request signal and the writing request signal are applied via the reading/writing control line 104a of the CPU 1, and 2105 an AND gate to which the outputs of the OR gate 2103 and the selection gate 2101 are applied. When the CPU 1 specifies an address in the sequence program memory 3 so as to produce the reading or writin request signa, the output of the AND gate 2105 is raised to "1".

Reference numeral 2102 designates a selection gate whose output is raised to "1" when the contents of the address bus 101a of the programming panel 11 are within the address range of the sequence program memory 3, 2104 an OR gate to which the reading request signal and the writing request signal are applied via the reading/writing control line 104b of the programming panel 11, and 2106 an AND gate to which the outputs of the OR ate 2104 and the selection gate 2102 are applied. When the programming panel 11 specifies an address in the sequence program memory 3 so as to produce the reading or writing request signal, then the output of the AND gate 2106 is set to "1".

The first switching gate further comprises D-type flip-flop 2107, 2108 and 2109. One ($\phi$b) of the fundamental clock timing signals of the CPU 1 is applied as a trigger pulse to the flip-flops 2107 and 2109 while a trigger pulse from $\overline{\phi b}$ is applied to the flip-flop 2108. The outputs $\overline{Q}$ of the flip-flops 2108 and 2109 are connected through a NOR gate 2110 to the reset terminal R of the flip-flop 2107 so that the flip-flop 2107 is set by the flip-flop 2108 or 2109. Furthermore, the flip-flops 2108 and 2109 are so connected that they are reset by the flip-flop 2107.

When the contents of the address bus 101 of the CPU 1 specifies an address in the sequence program memory 3 corresponding to the issuance of the reading or writing request signal on the reading/writing control line 104a, then the output of the AND gate 2101 is raised to "1" as described above and the output Q of the flip-flop 2107 is set to "1" at the rising edge of the next clock pulse φb. The conditions necessary in this case are that the outputs Q of the flip-flops 2108 and 2109 are at "0" and the input at the reset terminal R of the flip-flop 2107 is at "0".

Similarly, when the programming panel 11 accesses the sequence program memory 3, the output of the AND gate 2106 is raised to "1". Then, the output Q of the flip-flop 2108 is set to "1" with at the rising edge of the next clock pulse of $\overline{\phi b}$ while the output of the flip-flop 2109 is raised to "1" at the rising edge of the following clock pulse of φb. The condition required in this case is that the output Q of the flip-flop 2107 is at "0", that is, the sequence program memory 3 is not being accessed by the CPU 1. Thus, when the CPU 1 is accessing the sequence program memory 3, the flip-flop 2107 is set to raise its output Q to "1" and when the programming panel 11 is accessing the memory 3 the flip-flop 2109 is set to raise its output Q to "1".

Reference numeral 2116 designates an AND gate group which is opened and closed by the outputs of the flip-flops 2107 and 2109. When the CPU 1 carries out the access operation, the output Q of the flip-flop 2107 is raised to "1" and the AND gate 2116A in the AND gate group 2116 is therefore opened as a result of which the address/data bus 101/102 of the CPU 1 is connected to the address/data bus 121/122 extending from the sequence program memory 3. When the programming panel 11 carries out the access operation, the output Q of the flip-flop 2109 is raised to "1" and the AND gate 2116B in the AND gate group 2116 is therefore opened as a result of which the address/data bus 101a/102a of the CPU 1 is connected to the address/data bus 121/122 extending from the sequence program memory 3. The data buses 101, 101a and 122 are bidirectional buses. Therefore, the corresponding AND gate group should be a bidirectional as well. However, for simplication of the drawing, the group is indicated as a unidirectional one. In practice, a bidirectional AND gate group should be employed as the AND gate group 2116.

An OR 2111 is operated by the output of the flip-flops 2107 and 2109. A one-shot pulse generator 2112 is operated by the output of the OR gate 2111. The access operation of the CPU 1 or the programming panel 11 raises the output of the flip-flop 2107 or 2109 as described above and in response to this at the rising edge of the output the one-shot pulse generator 2112 generates a pulse having a predetermined pulse width.

An AND gate group 2117 includes AND gates 2117A which are opened when the output Q of the flip-flop 2107 is set to "1" and AND gates 2117B which are opened when the output Q of the flip-flop 2109 is raised to "1". The AND gate group 2117 selects either the reading/writing control line 104a or 104b of the CPU 1 or the programming panel 11. The reading/writing request signal is applied to the reading/writing control line 123 coupled to th sequence program memory 3 through an OR gate group 2118 and through an AND gate group 2119 which is operated by the output pulse of the one-shot pulse generator 2112 immediately after the flip-flop 2107 or 2109 is set.

Reference numeral 2113 designates a one-shot pulse generator which is identical to the one-shot pulse generator 2112. The one-shot pulse generator 2113 generates a pulse in synchronization with the trailing edge of the output pulse of the one-shot pulse generator 2112.

Reference numeral 2114 designates an AND gate which is opened when the output Q of the flip-flop 2107 is set to "1" while reference numeral 2115 designates an AND gate with is opened when the output Q of the flip-flop 2109 is set to "1". By supplying the output pulse of the one-shot pulse generator 2113 as the answer back signal to the reading/writing answer back signal line 104c or 104d of the CPU 1 or the programming panel 11, the completion of the reading/writing operation is indicated. In response to this answer back signal, the contents of the address bus 101 or 101a of the CPU 1 or the programming panel 11 are reset and the reading/writing request signal is turned off. The flip-flop 2107 or the flip-flops 2108 and 2109 are reset in synchronization with the rise of the next clock pulse of the ckock pulse streams φb or $\overline{\phi b}$. Thus, the reading/writing operation is accomplished.

Figure 8:
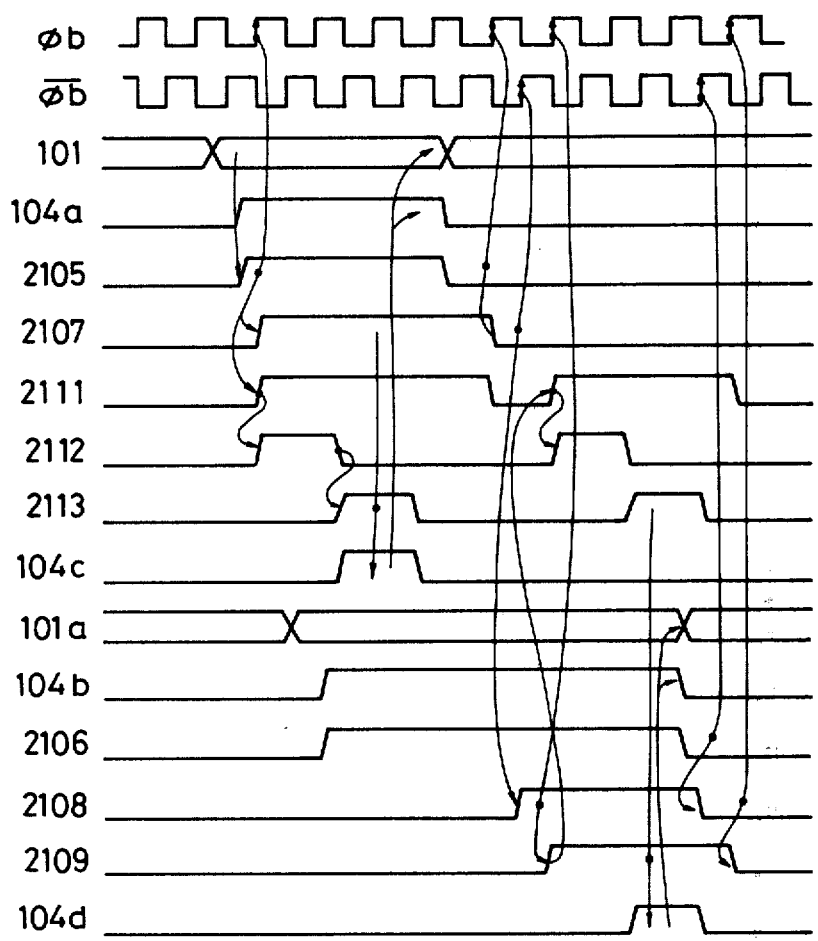
FIG. 8 is a timing diagram indicating the timing and relative phase relationships of signals useful for facilitating a description of the operation of the first switching gate shown in FIG. 7.

FIG. 8 is a series of timing diagrams which illustrate relative relationships of the signals employed in the case where, first the CPU 1 accesses the sequence program memory 3 but before the access operation is completed the programming panel 11 accesses the sequence program memory 3.

Even if the programming panel 11 accesses the sequence program memory 3 while the CPU 1 is accessing the memory 3 with the result that the output of the AND gate 2106 is raised to "1", the output of the flip-flop 2107 is at "1". accordingly, at the timing of the rise of the clock pulse of the stream $\overline{\phi b}$, the output of the flip-flop 2108 is not raised to "1" and therefore the output of the flip-flop 2109 connected thereto is not raised to "1". Thus, the first switching gate does not respond to the bus request from the programming panel 11, that is, the bus request from the programming panel 11 is queued.

However, when the access to the sequence program memory 3 by the CPU has been completed, the output of the flip-flop 2107 is set to "0" and consequently the output of the AND gate 2106 is at "1". Therefore, the output Q of the flip-flop 2108 is raised to "1" at the leading edge of the next clock pulse of stream $\overline{\phi b}$ while the output Q of the flip-flop 2109 is also raised to "1" at the leading edge of the next succeeding clock pulse of stream $\overline{\phi b}$. Thus, the reading/writing operation is carried out in succession in response to the access of the programming panel 11.

In the above description, the programming panel 11 issues a bus request signal to the sequence program memory 3 while the CPU 1 is accessing the memory 3. However, the above-described technical concept can of course be applied to the opposite case as well.

The relation in frequency and phase between the above-described clock pulse streams φb and φa (FIG. 5) is defined. In general, Period of φb = n × (period of φa).

The clock pulse stream φb is in phase with the clock pulse stream φa. The value n depends on an instruction to be executed by the CPU 1 with the value n normally in the range of 2 to 10 (n = 2 to 10).

The phase difference between the clock pulse streams φb and $\overline{\phi b}$ is 180°. The clock pulse stream $\overline{\phi b}$ is applied to the flip-flop 2108 so that the outputs of the flip-flops 2107 and 2108 are not raised to "1" simultaneously. That is, even if the D input of the flip-flop 2108 is raised to "1" at the same time that the input is applied to the flip-flop 2107, the respective clock pulse are different by 180° in phase.

Figure 9:
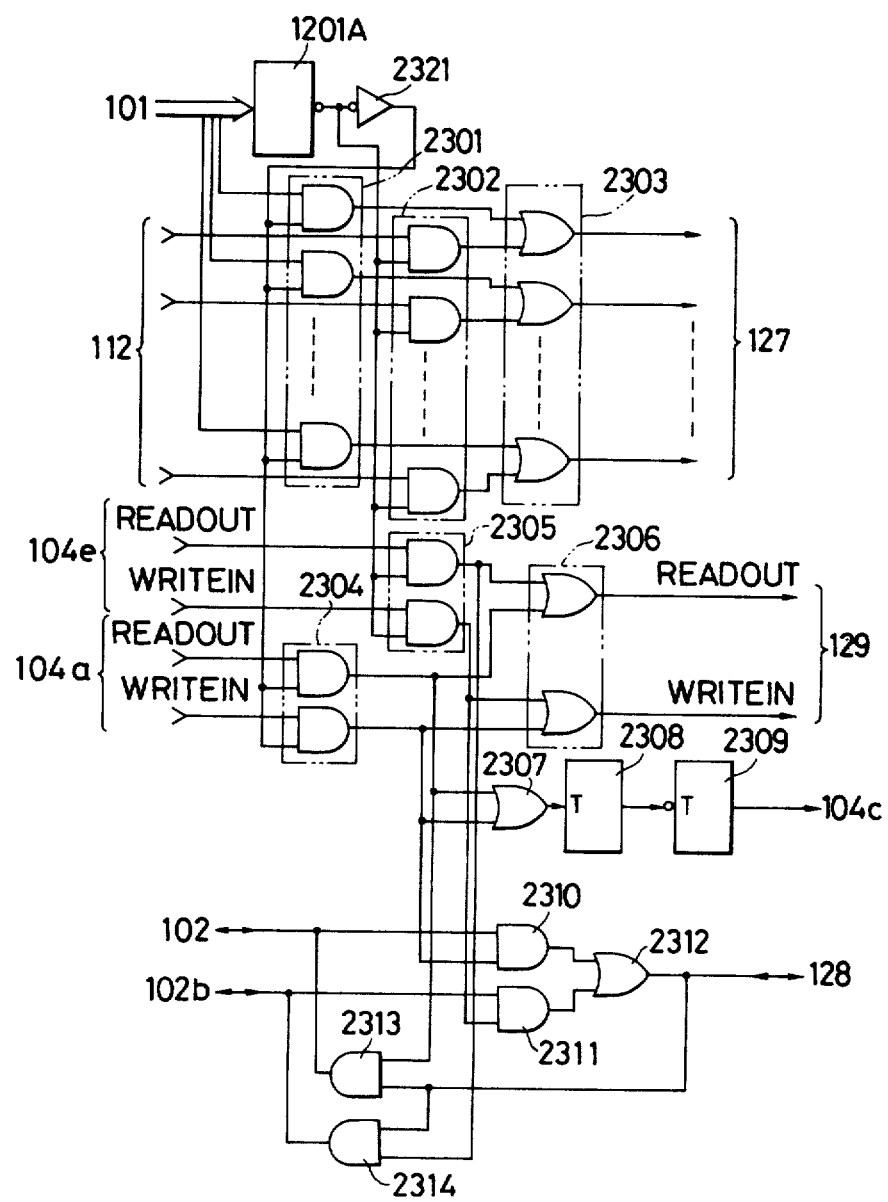
FIG. 9 is a block diagram showing an arrangement of a third switching gate in the programmable sequence controller shown in FIG. 4.

FIG. 9 shows an arrangement of one example of the third switching gate 23.

In FIG. 9, reference character 1201A designates a selection gate whose output is raised to "1" only when the contents of the address bus 101 of the CPU 1 specifies an address in the region of the input and output memory 20. The selection gate 1201A is similar to the selection gate 1201 employed in the input and output processing device 12.

Reference numeral 2321 designates an inverter which inverts the output of the selection gate 1201A while reference numeral 2301 designates and AND gate group which is operated by the output of the inverter 2321. The AND gate group 2301 gates a part of the address bus 101 of the CPU 1. Reference numeral 2302 designates an AND gate group which is operated by the output of the selection gate 1201A. The AND gate group 2302 operates to gate the address bus 112 from the input and output processing device 12. Reference numeral 2303 designates a group of OR gates for performing the OR-logic operations of the respective bits of the AND groups 2301 and 2302. When the CPU 1 accesses the input and output memory 20, a part of its contents which relates to the input and output memory 20 of the data bus 101 of the CPU 1 is coupled out to the address bus 127 of the input and output memory 20 via the AND gate group 2301 and the OR gate group 2303. When the CPU 1 is not accessing the input and output memory 20, the contents of the address bus 112 from the input and output processing device 12 are coupled via the AND gate group 2302 and the OR gate group 2303 to the address bus 127 of the input and output memory 20.

The third switching gate further includes an AND gate group which is opened when the CPU 1 is accessing the input and output memory 20, and AND gate group which is opened when the CPU 1 is not accessing the input and output memory 20, and a group of OR gates 2306 which perform the OR-logic operations on the respective bits of the AND gate groups 2304 and 2305. Similarly to the case of the above-described AND gate groups 2301 and 2302 and OR gate group 2303, the reading/writing control line 104a of the CPU 1 is connected to the reading/writing control line 129 of the input and output memory 20 when the CPU 1 is accessing the input and output memory 20 while the reading/writing control line 104e of the input and output processing device 12 is connected to the reading/writing control line 129 of the input and output memory 20 when the CPU 1 is not accessing the input and output memory 20.

In FIG. 9, reference numeral 2310 designates an AND gate which is opened by the writing request signal from the CPU 1, 2311 an AND gate which is opened by the writing request signal from the input and output processing device 12, 2313 an AND gate which is opened by the reading request signal from the CPU 1, 2314 an AND gate which is opened by the reading request signal from the input and output processing device 12, and 2312 an OR gate. Switching the data line 128 in the third switching gate 23 is effected by the AND gates 2310, 2311, 2313 and 2314 and the OR gate 2312 as follows:

(a) Reading into the CPU 1
Data line 128→AND gate 2313→one particular bit of data bus 102

(b) Writing from the CPU 1
On particular bit of data bus 102→AND gate 2310→OR gate 2312→data line 128

(c) Reading into the input and output processing device 12
Data line 128→AND gate 2314→data line 102b (d) Writing from the input and output processing device 12
Data bus 102b→AND gate 2311→OR gate 2312→Data line 128

Reference numeral 2307 designates an OR gate through which the outputs of the AND gate group 2304 gate the reading/writing request signal on the reading/writing control line 104a of the CPU 1. Reference numerals 2308 and 2309 designate a one-shot pulse generator which receives the output of the OR gate 2307 and generates a pulse of a predetermined duration after a predetermined delay time. The output of the one-shot pulse generator is employed as the answer back signal to the reading/writing request of the CPU 1.

In the example described above, it is impossible to access the input and output memory 20 directly from the programming panel 11. However, if a fourth switching gate similar to the first switching gate is inserted in the bus on the CPU side of the third switching gate, then it becomes possible to access the input and output memory 20 directly from the programming panel 11.

In the above-described example, the programming panel 11 is employed as the second processing device. However, a process computer may be employed as the second processing device. In this case, monitoring the operation of the CPU and charging or modifying the sequence program can be achieved by the process computer. Furthermore it is obvious that an operation processing device other than the microcomputer chip may be used as the CPU which is the first processing device.

What is claimed is:

1. A sequence controller comprising:
a first memory for storing data representing a series of predetermined sequence control steps;
a first processing unit for reading out the data representing the series of sequence control steps stored in the first memory and for controlling execution of the sequence control steps;
a second memory for temporarily storing data for execution of sequence control steps when execution of said steps is being performed by the first processing unit;
a second processing unit comprising at least one of means for reading and displaying at least portions of the data stored in the first memory, means for converting externally supplied sequence control information data into a predetermined format and writing the data in the format into the first memory, and means for reading and displaying the temporarily stored data in the second memory;
a third memory having an input memory portion and an output memory portion, the output memory portion storing output information data from the first processing unit produced in response to execution by the first processing unit of the sequence control steps and the input memory portion storing information representing parameters of an externally controlled process;
means for operating the externally controlled process in response to the output information data stored in the third memory;

a third processing unit, said third processing unit comprising means for determining when the first processing unit is not accessing the third memory, means for sequentially reading out the output information data stored in the output memory portion and transferring the output information data to the means for operating the externally controlled process, and means for sequentially writing data representing the parameters of the externally controlled process into the input memory portion, the reading and transferring means and the writing means being operative when and only when the determining means indicates that the first processing unit is not accessing the third memory unit;

first, second and third switching gates coupled to the first, second and third memories, respectively, the first and second switching gates being responsive only to read/write requests supped randomly from the first and second processing units for transferring data between the first and second memories and the first and second processing units, and said third switching gate being responsive only to read/write requests supplied from the first processing device and the third processing device for transferring data between the third memory and the first and third processing devices, respectively; and first and second read/write control lines coupled to the first and second processing units, respectively, and to the first, second and third switching gates for selectively coupling the first and second processing units to the first, second and third memories, the first and second read/write lines operating independently of one another.

2. The sequence controller of claim 1, wherein the capacities of the input and output memory portions are larger than a maximum number of input data points, corresponding to the information representing the parameters of the externally controlled process, and a maximum number of output data points, corresponding to said output information data, required for operating the externally controlled process operated by the corresponding controller.

3. The sequence controller of claim 1 further comprising first and second answer back lines corresponding to said first and second read/write lines, respectively, said first and second processing units producing answer back signals on the first and second answer back lines, respectively, in response to read/write signals on the corresponding read/write line.

4. The sequence controller of claim 2, wherein the third processing unit comprises a counter having a count capacity larger than a sum of the maximum number of input data points and the maximum number of output data points, outputs of said counter being coupled as an address to the third switching gate and the means for operating the externally controlled process and means for producing clock pulses for operating said counter only when said third memory is not being accessed by said first processing unit.

5. The sequence controller of claim 1 wherein the first processing unit comprises a microcomputer chip.

6. The sequence controller of claim 1 wherein the second processing unit comprises a programming panel having a keyboard and displaying means.

7. The sequence controller of claim 1 wherein the second processing unit comprises a process computer for monitoring the operation of the first processing unit and for revising a sequence program.

* * * * *